US009614794B2

(12) United States Patent
Kizhakkiniyil et al.

(10) Patent No.: US 9,614,794 B2
(45) Date of Patent: Apr. 4, 2017

(54) MESSAGE CONSUMER ORCHESTRATION FRAMEWORK

(71) Applicant: APOLLO GROUP, INC., Phoenix, AZ (US)

(72) Inventors: Sajithkumar Kizhakkiniyil, Pleasanton, CA (US); Narender Vattikonda, San Jose, CA (US); Jeevan Pingali, Bangalore (IN); Rahul Kumar, Bangalore (IN); Krishnam Chapa, Karnataka (IN)

(73) Assignee: Apollo Education Group, Inc., Phoenix, AZ (US)

( * ) Notice: Subject to any disclaimer, the term of this patent is extended or adjusted under 35 U.S.C. 154(b) by 751 days.

(21) Appl. No.: 14/013,136

(22) Filed: Aug. 29, 2013

(65) Prior Publication Data

US 2015/0019655 A1 Jan. 15, 2015

(30) Foreign Application Priority Data

Jul. 11, 2013 (IN) .......................... 3096/CHE/2013

(51) Int. Cl.
*H04L 12/58* (2006.01)
*G06F 15/16* (2006.01)

(52) U.S. Cl.
CPC .................. *H04L 51/06* (2013.01)

(58) Field of Classification Search
CPC . H04L 51/06; H04L 41/0813; H04L 41/0816; H04L 41/0823
USPC .................................. 709/206, 226
See application file for complete search history.

(56) References Cited

U.S. PATENT DOCUMENTS

| 5,280,470 | A | * | 1/1994 | Buhrke | H04L 12/5602 370/232 |
| 5,313,454 | A | * | 5/1994 | Bustini | H04L 12/5602 370/231 |
| 5,315,586 | A | * | 5/1994 | Charvillat | H04L 12/5602 370/232 |
| 5,381,413 | A | * | 1/1995 | Tobagi | H04L 47/10 370/232 |
| 5,799,002 | A | * | 8/1998 | Krishnan | H04L 12/5695 370/234 |
| 6,032,192 | A | * | 2/2000 | Wegner | H04M 15/00 709/206 |

(Continued)

*Primary Examiner* — Kostas Katsikis
(74) *Attorney, Agent, or Firm* — Hickman Palermo Becker Bingham LLP

(57) ABSTRACT

In a decoupled messaging system, a producer device sends produced messages to a message fabric. The message fabric either stores the received message in designated queues, from which consumer devices may retrieve the messages, or broadcasts the messages to consumer devices that subscribe to topics assigned to the messages. A message consumption orchestrator service gathers capabilities information for the message producer, the message fabric, and the message consumer, and configures resources allocated for the message consumer to more fully optimize message throughput. Further, the message consumption orchestrator identifies patterns in changes of the rate of produced messages, i.e., through analysis of historical data and/or received information. The message consumption orchestrator configures resources for the message consumer to account for predicted need based on the identified patterns.

8 Claims, 5 Drawing Sheets

(56) References Cited

U.S. PATENT DOCUMENTS

| | | | | |
|---|---|---|---|---|
| 6,473,793 B1* | 10/2002 | Dillon | H04B 7/18584 | 370/235 |
| 6,507,643 B1* | 1/2003 | Groner | H04L 51/066 | 379/88.14 |
| 6,961,341 B1* | 11/2005 | Krishnan | H04J 3/1682 | 370/412 |
| 7,080,141 B1* | 7/2006 | Baekelmans | G06F 11/0709 | 709/202 |
| 7,219,131 B2* | 5/2007 | Banister | G06Q 10/107 | 709/202 |
| 8,782,211 B1* | 7/2014 | Sharma | H04L 67/1036 | 709/224 |
| 8,977,903 B1* | 3/2015 | Chandrasekharapuram | G06F 11/263 | 714/32 |
| 8,984,341 B1* | 3/2015 | Chandrasekharapuram | G06F 11/263 | 714/32 |
| 9,231,897 B1* | 1/2016 | Liden | H04L 51/12 | |
| 9,329,915 B1* | 5/2016 | Chandrasekharapuram | G06F 11/00 | |
| 9,459,980 B1* | 10/2016 | Arguelles | G06F 11/30 | |
| 2003/0078965 A1* | 4/2003 | Cocotis | H04L 29/06 | 709/203 |
| 2003/0158902 A1* | 8/2003 | Volach | H04L 12/581 | 709/206 |
| 2004/0068756 A1* | 4/2004 | Chiu | H04N 21/43615 | 725/135 |
| 2005/0071457 A1* | 3/2005 | Yang-Huffman | H04L 41/0893 | 709/224 |
| 2005/0089063 A1* | 4/2005 | Haruna | G06F 9/505 | 370/468 |
| 2005/0188028 A1* | 8/2005 | Brown | H04L 51/12 | 709/206 |
| 2005/0273507 A1* | 12/2005 | Yan | H04L 41/0896 | 709/223 |
| 2006/0064527 A1* | 3/2006 | Fisher | G06F 11/0727 | 710/200 |
| 2006/0209868 A1* | 9/2006 | Callaghan | G06Q 10/00 | 370/428 |
| 2007/0156822 A1* | 7/2007 | Modaresi | G06Q 10/107 | 709/206 |
| 2008/0141175 A1* | 6/2008 | Sarna | H04L 29/06027 | 715/848 |
| 2009/0133039 A1* | 5/2009 | Chkodrov | H04L 12/58 | 719/314 |
| 2010/0115135 A1* | 5/2010 | Zhou | H04L 41/0681 | 709/247 |
| 2010/0144378 A1* | 6/2010 | Futty | H04L 12/1471 | 455/466 |
| 2011/0096354 A1* | 4/2011 | Liu | G06F 3/1204 | 358/1.15 |
| 2011/0161973 A1* | 6/2011 | Klots | G06F 17/30566 | 718/104 |
| 2011/0239226 A1* | 9/2011 | Placanica | G06F 9/546 | 719/313 |
| 2012/0144038 A1* | 6/2012 | Hildebrand | H04L 41/0806 | 709/226 |
| 2012/0215620 A1* | 8/2012 | Rodkey | G06Q 30/0215 | 705/14.39 |
| 2012/0303413 A1* | 11/2012 | Wang | G06Q 10/0631 | 705/7.31 |
| 2013/0339454 A1* | 12/2013 | Walker | H04L 51/04 | 709/206 |

* cited by examiner

202
GATHER CAPABILITIES INFORMATION FOR AT LEAST ONE OF: A MESSAGE PRODUCER, A MESSAGE FABRIC, AND A MESSAGE CONSUMER

204
BASED, AT LEAST IN PART, ON THE CAPABILITIES INFORMATION, AUTOMATICALLY ADJUST A CONFIGURATION OF CONSUMER RESOURCES ASSOCIATED WITH THE MESSAGE CONSUMER BY ADDING AT LEAST ONE CONSUMER CLONE EXECUTING ON ONE OR MORE DEVICES THAT ARE NOT CURRENTLY USED TO PULL MESSAGES FROM THE MESSAGE FABRIC FOR THE MESSAGE CONSUMER

MESSAGE CONSUMER ORCHESTRATION FRAMEWORK

BENEFIT CLAIM AND CROSS-REFERENCE TO RELATED APPLICATIONS

This application claims priority to Indian Patent Appln. No. 3096/CHE/2013, filed Jul. 11, 2013, titled "Message Consumer Orchestration Framework", under 35 U.S.C. §119 (a). The entire contents of the above-mentioned application are hereby incorporated by reference as if fully set forth herein. Applicants hereby rescind any disclaimer of claim scope in the parent and related application.

FIELD OF THE INVENTION

The present invention relates to optimizing message throughput in decoupled message producer/consumer systems, and, more specifically, to automatically adjusting the resources being used for a message consumer of the system.

BACKGROUND

It is useful, especially in information processing, to decouple an information producer from a consumer of the produced information. Such decoupling may be useful when an information producer produces information at a rate that is faster than an information consumer can process the information.

To decouple an information producer from an information consumer, the information producer sends produced information in messages to a third party message management system (i.e., a "message fabric") instead of sending the information directly to the information consumer. The message fabric stores messages until the information consumer requests the messages.

Many times, resources for a messaging system are configured without respect to the capabilities of the messaging system components, i.e., the information producer, message fabric, and information consumer. As such, the throughput of a messaging system may be at a sub-optimal rate, given the capabilities of the system. It would be advantageous to configure resources for a messaging system based, at least in part, on the capabilities of the messaging system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In a decoupled messaging system, a producer device sends produced messages to a message fabric. The message fabric either stores the received message in designated queues, from which consumer devices may retrieve the messages, or broadcasts the messages to consumer devices that subscribe to topics assigned to the messages. According to one embodiment, the decoupled messaging system includes a message consumption orchestrator service that gathers capabilities information for the message producer, the message fabric, and the message consumer, and configures resources allocated for the message consumer to more fully optimize message throughput.

Further, the message consumption orchestrator identifies patterns in changes of the rate of produced messages, i.e., through analysis of historical data and/or received information. The message consumption orchestrator configures resources for the message consumer to account for predicted need based on the identified patterns.

Specifically, the message consumption orchestrator records collected capabilities information and/or received information as historical information. From such historical information, the message consumption orchestrator identifies changes in the rate of messages sent to a particular message queue from message producer service 152. The message consumption orchestrator further identifies patterns in changes in the rate of messages, and adjusts a configuration of consumer resources for the message consumer based, at least in part, on identified patterns.

BRIEF DESCRIPTION OF THE DRAWINGS

In the drawings:

FIG. 2 depicts a flowchart for gathering capabilities information for a messaging system and adjusting the configuration of consumer resources based on the capabilities information.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the disclosure.

General Overview

In a decoupled messaging system, a producer device sends produced messages to a message fabric. The message fabric either stores the received message in designated queues, from which consumer devices may retrieve the messages, or broadcasts the messages to consumer devices that subscribe to topics assigned to the messages. According to one embodiment, the decoupled messaging system includes a message consumption orchestrator service that gathers capabilities information for the message producer, the message fabric, and the message consumer, and configures resources allocated for the message consumer to more fully optimize message throughput.

Further, the message consumption orchestrator identifies patterns in changes of the rate of produced messages, i.e., through analysis of historical data and/or received information. The message consumption orchestrator configures resources for the message consumer to account for predicted need based on the identified patterns.

Specifically, the message consumption orchestrator records collected capabilities information and/or received information as historical information. From such historical information, the message consumption orchestrator identifies changes in the rate of messages sent to a particular message queue from message producer service 152. The message consumption orchestrator further identifies patterns in changes in the rate of messages, and adjusts a configuration of consumer resources for the message consumer based, at least in part, on identified patterns.

Decoupled Messaging System Architecture

Figure 1:
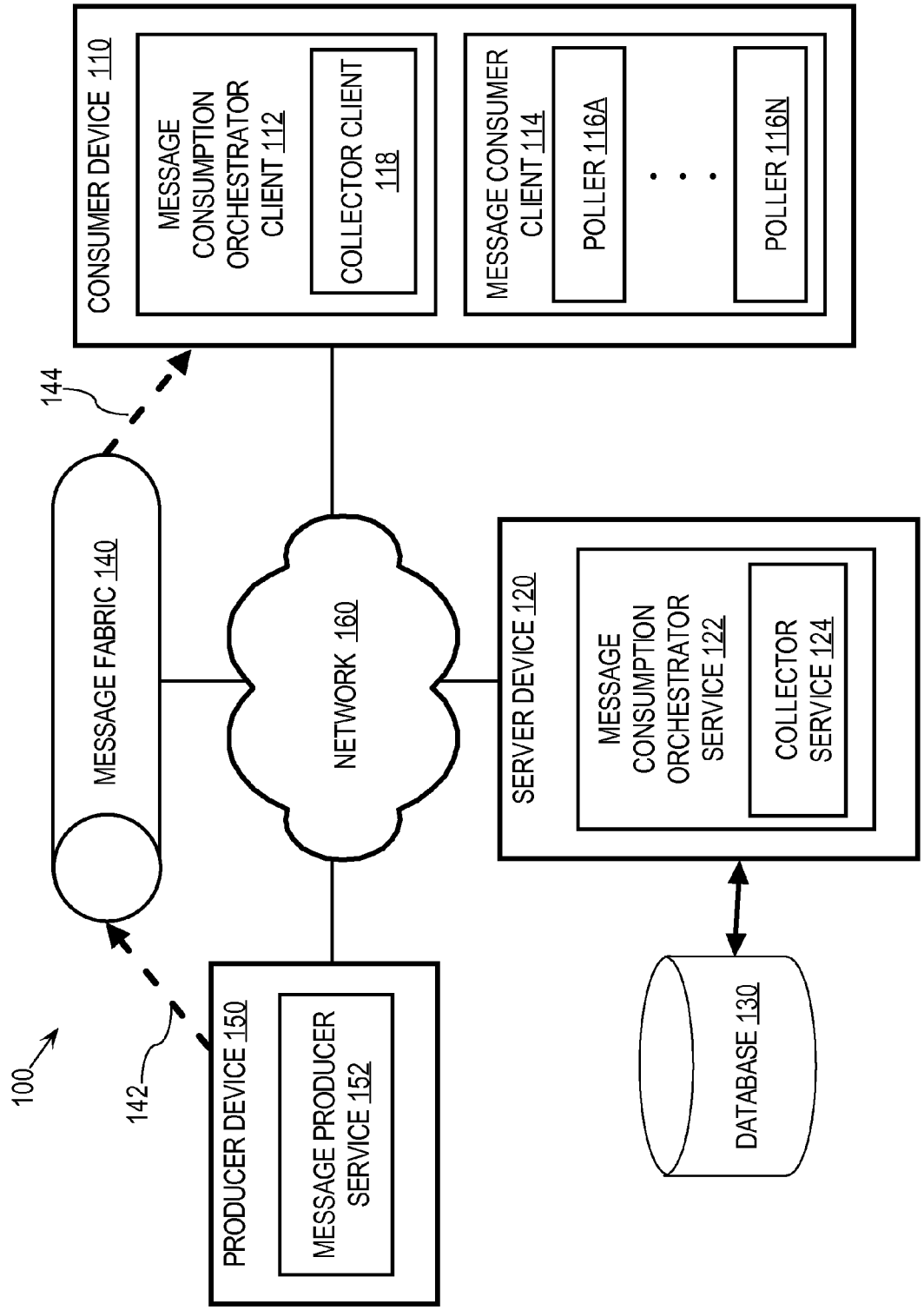
FIG. 1 is a block diagram that depicts an example network arrangement for optimizing the throughput of a decoupled messaging system.

Techniques are described hereafter for optimizing the throughput of a decoupled messaging system. FIG. 1 is a block diagram that depicts an example network arrangement 100 for optimizing the throughput of a decoupled messaging system. Network arrangement 100 includes a consumer device 110, a server device 120, a message fabric 140, and a producer device 150, communicatively coupled via a network 160. Server device 120 is also communicatively coupled to a database 130. According to embodiments, part or all of example network arrangement 100 and are managed by a cloud computing service or by one or more virtual computing environments. References to cloud computing services herein are non-limiting.

Example network arrangement 100 may include other devices, including client devices, server devices, other kinds of computing devices, and display devices, according to embodiments. For example, according to embodiments, one or more additional consumer devices may be communicatively coupled to network arrangement 100, as described in further detail below. Example implementations of a display device include a monitor, a screen, a touch screen, a projector, a light display, a display of a tablet computer, a display of a telephony device, a television, etc.

Consumer device 110 may be implemented by any type of computing device that is communicatively connected to network 160. Example implementations of consumer device 110 include, without limitation, mobile phones, personal digital assistants, tablets, workstations, personal computers, laptop computers, and any other type of computing device. In network arrangement 100, consumer device 110 is configured with a Message Consumption Orchestrator (MCO) client 112, and a message consumer client 114 having one or more pollers 116A-116N. MCO client 112 is configured with a collector client 118. MCO client 112 and message consumer client 114 may be implemented by one or more logical modules, and is described in further detail below. Consumer device 110 may be configured with other mechanisms, processes and functionalities, depending upon a particular implementation, including, for example, Business Services and components.

Server device 120 may be implemented by any type of computing device that is capable of communicating with at least consumer device 110 over network 160. In network arrangement 100, server device 120 is configured with a Message Consumption Orchestrator (MCO) service 122, which includes a collector service 124. MCO service 122 and collector service 124 may be implemented by one or more logical modules, and are described in further detail below. Server device 120 may be configured with other mechanisms, processes, and functionalities, depending upon a particular implementation. According to another embodiment, MCO service 122 runs on consumer device 110. In this embodiment, MCO service 122 performs one or more functions attributed herein to MCO client 112.

Server device 120 is communicatively coupled to database 130. Database 130 may reside in any type of storage, including volatile and non-volatile storage including random access memory (RAM), one or more hard or floppy disks, or main memory. The storage on which database 130 resides may be external or internal to server device 120. Database 130 stores information gathered by collector service 124 and/or information from MCO service 122.

Message fabric 140 comprises at least one or more message queues, and may be implemented on any one of the devices depicted in FIG. 1, or may be implemented by a distinct computing device that is communicatively connected to network 160 and that is not depicted in FIG. 1. Message flow indicators 142 and 144 depict the logical flow of messages between producer device 150, message fabric 140, and consumer device 110. Message fabric 140 is communicatively coupled to producer device 150 and to consumer device 110 via network 160.

Producer device 150 may be implemented by any type of computing device that is capable of communicating with at least message fabric 140 over network 160. In network arrangement 100, producer device 150 is configured with a message producer service 152. Message producer service 152 may be implemented by one or more logical modules, and is described in further detail below. Producer device 150 may be configured with other mechanisms, processes and functionalities, depending upon a particular implementation.

Network 160 may be implemented with any type of medium and/or mechanism that facilitates the exchange of information between the devices in network arrangement 100. Furthermore, network 160 may use any type of communications protocol, and may be secured or unsecured, depending upon the requirements of a particular embodiment.

The services and clients of network arrangement 100 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from another component of network arrangement 100. Further, the services and clients of network arrangement 100 may send one or more of the following over network 160 to another component of network arrangement 100: information via HTTP, HTTPS, SMTP, etc.; XML data; SOAP messages; API calls; and other communications according to embodiments.

In an embodiment, each of the processes described in connection with one or more of the clients and services of network arrangement 100 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Decoupled Messaging System

The messaging system depicted in network arrangement 100 includes message producer service 152 running on producer device 150, message fabric 140, and message consumer client 114 running on consumer device 110. Message producer service 152 is configured to transmit information in messages to message consumer client 114 via message fabric 140. Message consumer client 114 retrieves or receives the messages from message fabric 140 and processes the messages. To retrieve messages from message fabric 140, message consumer client 114 uses a poller, such as poller 116A, which is configured to retrieve a certain number of messages from a message queue of message fabric 140 at a certain frequency, e.g., 10 messages per second.

For example, message producer service 152 sends a message with credit check information, used to validate a credit card transaction, to a particular queue in message fabric 140. Message fabric 140 stores messages in the particular queue for a configurable length of time, such as 14 days. Message consumer client 114 retrieves messages from the particular queue for processing. Thus, message consumer client 114 retrieves and processes messages from message producer service 152 asynchronously from when the messages are produced.

In order to process the messages with credit check information, message consumer client 114 performs one or more of: parsing the message information; retrieving information from a database accessible by message consumer client 114; retrieving information from external sources, such as credit card agencies (not shown in network arrangement 100); dispatch messages to devices not shown in network arrangement 100; etc.

Such a decoupled messaging system can be used to perform any task where it would be beneficial for message producers and consumers to work asynchronously, e.g., when the information producer and the information consumer have different throughput capabilities.

Gathering Capabilities Information

FIG. 2 depicts a flowchart 200 for gathering capabilities information and adjusting the configuration of consumer resources based on the gathered information. At step 202, capabilities information is gathered for at least one of: a message producer, a message fabric, and a message consumer. For example, MCO service 122 collects information from and/or derives information about the capabilities of the messaging system illustrated in example network arrangement 100. MCO service 122 receives capabilities information through collector service 124. According to an embodiment, MCO service 122 derives capabilities information from data gathered by collector service 124, as described in further detail below. According to an embodiment, MCO service 122 stores gathered capabilities information and/or derived capabilities information in database 130.

Gathering Capabilities Information for the Message Consumer

According to an embodiment, collector client 118 is configured with one or more collectors, each of which collects one or more kinds of static and/or dynamic capabilities information for message consumer client 114 and/or consumer device 110. MCO client 112 reports the collected capabilities information to MCO service 122 via collector client 124. MCO client 112 performs a handshake with MCO service 122 upon sending information to MCO service 122 to authenticate the identity of MCO client 112.

Examples of static capabilities information include the top CPU speed for consumer device 110, total RAM memory for consumer device 110, etc. Examples of dynamic capabilities information include RAM memory that is currently available on consumer device 110; current CPU usage; how many pollers 116A-116N are currently running in connection with message consumer client 114; other capabilities information for message consumer client 114; current throughput for a database (not shown in example network arrangement 100) that is being used by message consumer client 114 to process messages; capabilities information for one or more other resources that are involved in processing messages; how much network bandwidth is available at consumer device 110; the average time that it takes message consumer client 114 to process a message; etc.

Collector client 118 is, by default, configured with one or more default collectors, to collect information from consumer device 110 and message consumer client 114. For example, default collectors at collector client 118 are configured to collect capabilities information about the infrastructure of collector device 110, including static and dynamic CPU and RAM data.

Custom Collectors

According to an embodiment, MCO client 112 provides a collector implementation framework by which custom collectors may be added to collector client 118. Through the collector implementation framework, an administrator of message consumer client 114 may create a custom collector, for collector client 118, e.g., to collect capabilities information that is specific to the processing of messages by message consumer client 114. As such, custom collectors may provide MCO service 122 with information about how quickly message consumer client 114 is able to process received messages, which affects message throughput at the message consumer.

For example, message consumer client 114 performs one or more queries on a database in connection with processing messages. An administrator implements a custom collector in collector client 118 that retrieves information about the average throughput of database queries on the database, e.g., by performing a query on the database that returns a processing grade for the kind of query that message consumer client 114 calls on the database. In response to the query, the database returns information indicating that the database processes a certain number of the queries per second (such as ten queries per second).

As another example, to process messages, message consumer client 114 communicates with a third party resource (not shown in network arrangement 100). The speed with which the third party resource responds to the communications from message consumer client 114 affects the throughput of messages at the message consumer. In this example, an administrator creates a custom collector at collector client 118 to collect information about how quickly the third party responds to the communications from message consumer client 114. Such a custom collector may request the information directly from the third party resource, or may derive the information from actual response times for the third party resource.

MCO client 112 sends the custom-collected information to MCO service 122, which uses the custom-collected information to calculate the speed with which message consumer client 114 processes messages. According to an embodiment, a custom collector includes one or more rules for translating the custom-collected information to a format that is usable by MCO service 122, e.g., to a standard unit of time. According to another embodiment, a custom collector produces data in a format expected by MCO service 122.

Gathering Capabilities Information for the Message Fabric

According to an embodiment, MCO service 122 gathers capabilities information of message fabric 140 by directly querying message fabric 140 for capabilities information. According to one embodiment, capabilities information for message fabric 140 includes one or more of:

how many messages message fabric 140 has in a particular queue;

how many messages message fabric 140 permits a particular poller 116 to draw from a particular queue at a time;

how much time a particular poller 116 must wait after retrieving messages from a particular queue to retrieve messages again.

Message fabric 140 may expose an API to MCO service 122, or allow SOAP queries, etc. by which MCO service 122 performs capability queries.

According to an embodiment, MCO service 122 derives capabilities information for message fabric 140 by analyzing information available at message consumer client 114 via collector client 118. To illustrate, message fabric 140 denies a request of poller 116A to retrieve eleven messages from a particular queue, and then allows a request of poller 116A to retrieve ten messages from the particular queue (all other things about the requests being similar). MCO service 122 derives, from the rejected request and the subsequent allowed request, that the limit of the number of messages that message fabric 140 permits a particular poller to draw from the particular queue at a time is ten messages.

Gathering Capabilities Information for the Message Producer

According to an embodiment, MCO service 122 gathers capabilities information—such as a rate at which message producer service 152 produces messages for message consumer client 114, a rate at which producer device 150 transmits messages to message fabric 140 for message consumer client 114, etc.—for producer device 150 and/or message producer service 152 by directly querying message producer service 152 or producer device 150. MCO service 122 may query the message producer directly, e.g., using a SOAP call.

According to an embodiment, MCO service 122 derives capabilities information associated with message producer service 152 and/or producer device 150. For example, MCO service directly queries message fabric 140 for a rate at which message fabric 140 receives messages from message producer service 152 for a particular queue. MCO service 122 derives that the rate at which producer device 150 sends messages to message fabric 140 for the particular queue directly correlates with the rate at which message fabric 140 receives messages from message producer service 152 for message consumer client 114.

Adjusting the Configuration of Consumer Resources Based on the Capabilities Information MCO service 122 uses the information from collector client 118 to identify needed adjustments to the resources being used for message consumer client 114, i.e., the pollers and/or the devices being used to pull messages from message fabric 140, and process messages, for message consumer client 114. Returning to flowchart 200 of FIG. 2, at step 204, a configuration of consumer resources associated with the message consumer are automatically adjusted, based, at least in part, on the capabilities information, by adding at least one consumer clone executing on one or more devices that are not currently used to pull messages from the message fabric for the message consumer.

For example, MCO client 112 sends, to MCO service 122, information indicating that the number of messages, in a particular message queue from which message consumer client 114 pulls messages, is increasing at a particular rate. For purposes of this example, MCO service 122 adjusts the resources for the message consumer based on information for a single message queue. However, within embodiments, MCO service 122 adjusts resources for the message consumer based on multiple sources of messages, including message queues and/or message broadcasts. Adjusting message consumer resources based on a rate of messages from a message broadcast source is described in more detail below.

From the capabilities information sent by MCO client 112, MCO service 122 determines that message consumer client 114 should pull messages from the queue at a faster rate than the client is currently pulling messages. According to an embodiment, MCO service 122 identifies a target pull rate, for the particular queue, at which message consumer client 114 should pull messages from the particular queue. For example, MCO service 122 determines that the target pull rate for the particular queue matches the rate that MCO service 122 has either been informed or has derived that message producer service 152 is currently sending messages to the particular queue. With message consumer client 114 pulling messages at such a target pull rate, the backlog of messages in the particular queue would no longer be increasing.

As a further example, MCO service 122 calculates a target pull rate for the particular queue that is faster than the rate that MCO service 122 has either been informed or has derived that message producer service 152 is currently sending messages to the particular queue. MCO service 122 may set such a target pull rate if the particular queue has more than a threshold number of messages stored therein. With message consumer client 114 pulling messages at such a target pull rate, the backlog of messages in the particular queue would decrease. Once MCO service 122 determines that the backlog of messages in the particular queue has reached a certain target number of messages, which may or may not equal the threshold number, MCO service 122 then sets a new target pull rate for the particular queue that matches the rate that message producer service 152 is sending messages to the particular queue.

If MCO service 122 determines that the target pull rate for the particular queue in message fabric 140 is greater than the rate at which message consumer client 114 is currently pulling messages from the particular queue, then MCO service 122 identifies needed adjustments to increase the resources allocated for message consumer client 114. In other words, one or more additional pollers and/or one or more message consumer client clones should be allocated to message consumer client 114 to increase the rate of pulling messages from the queue to the target pull rate.

Adjusting the Number of Pollers

MCO service 122 may increase the number of pollers 116, associated with message consumer client 114, that simultaneously pull messages from the particular queue to increase the rate at which message consumer client 114 actually pulls messages from the particular message queue. MCO service 122 may also cause that all of pollers 116 are pulling the maximum number of messages that message fabric 140 allows, which maximum number is determined from the gathered capabilities information. For purposes of this example, it is assumed that all pollers are pulling messages from message fabric 140 at the maximum allowed rate.

Based on the capabilities information for consumer device 110, MCO service 122 determines whether consumer device 110 has the capacity to run one or more additional pollers in addition to pollers 116A-116N. Such a determination is based, at least in part, on one or more of: capabilities information indicating the capacity of the infrastructure of consumer device 110 (e.g., CPU, RAM); capabilities information indicating a speed with which message consumer client 114 processes messages; etc.

For example, if consumer device 110 has the capacity to run one or more additional pollers based on the infrastructure of the device, but message consumer client 114 cannot process messages any faster than it currently processes messages, then adding a poller to message consumer client 114 will not increase the throughput of messages for message consumer client 114. If a database that message consumer client 114 queries during message processing could not handle more queries than the database currently handles, then configuring message consumer client 114 to retrieve more messages from message fabric would not result in greater throughput of messages by the message consumer. As a result, MCO service 122 requests additional resources from a cloud computing service, as described in detail below.

Also, if a third party resource, to which message consumer client 114 sends messages during processing of messages, cannot process more messages than the resource currently receives, then increasing message throughput for message consumer client 114 would be a waste of resources However, if consumer device 110 has the capacity to run one or more additional pollers, and message consumer client 114 has the capability to process messages faster than it currently processes messages, then adding an additional poller to message consumer client 114 would increase the throughput of messages for message consumer client 114.

If MCO service 122 determines that adding a poller to message consumer client 114 is feasible and would increase message throughput, then MCO service 122 calculates the number of additional pollers that would cause message consumer client 114 to pull messages from the particular queue at the target pull rate. Also, based, at least in part, on capabilities information sent to MCO service 122 by MCO client 112, MCO service 122 determines a number of additional pollers that MCO service 122 could feasibly and usefully add to message consumer client 114.

For example, MCO service 122 determines that four additional pollers are needed to achieve the target pull rate, and that consumer device 110 has the capacity to run four additional pollers. Thus, MCO service 122 causes four additional pollers 116 to run at message consumer client 114. As a further example, if MCO service 122 determines that three pollers are needed to achieve the target pull rate, and consumer device 110 has the capacity to run four pollers, then MCO service 122 causes three additional pollers to run at message consumer client 114. According to these examples, no additional resources are needed to achieve the target pull rate for the particular queue.

As yet a further embodiment, MCO service 122 provides, to MCO client 112, logic that allows MCO client 112 to calculate a number of pollers to instruct message consumer client 114 to run. MCO client 112 uses the logic to identify the number of pollers to run and causes message consumer client 114 to run that number of pollers.

According to an embodiment, MCO service 122 provides, to MCO client 112, logic that allows MCO service 122 to dynamically adjust the number of pollers 116A-116N running at message consumer client 114 based on the current capacity of consumer device 110 (i.e., based on gathered capabilities information for CPU, RAM, etc). For example, the logic indicates that if the system capacity of consumer device 110 increases by a certain amount, or has a certain total amount of available resources for pollers, then MCO client 112 should automatically cause message consumer client 114 to run an additional poller 116. As yet another example, the logic indicates that if the system capacity of consumer device 110 decreases to a certain total amount of available resources for pollers, or the total amount of available resources decreases by a certain amount, then MCO client 112 should automatically cause message consumer client 114 to terminate one or more of pollers 116A-116N. According to an embodiment, MCO client 112 reports such automatic addition or reduction of a poller to MCO service 122.

Adding a Consumer Clone

If the maximum number of pollers that consumer device 110 is able to run (e.g., because the available system resources, such as CPU, RAM, etc., or because of limitations during message processing, etc.) is insufficient to achieve the target pull rate, then MCO service 122 requests additional resources to be dynamically provisioned from a cloud computing service that manages consumer device 110. The request includes requested device specifications that are sufficient to run the number of additional pollers needed to achieve the target pull rate for message consumer client 114.

The cloud computing system, in response to the request, dynamically provisions one or more computing devices that collectively meet or exceed the requested specifications. In one embodiment, a cloud computing service dynamically provisions a device by selecting one or more devices, from among multiple available devices managed by the cloud computing service, based, at least in part, on one or more of:
the requested specifications of MCO service 122;
resource requests by other entities;
a projected need for resources projected by the cloud computing service.

According to an embodiment, MCO service 122 receives a rejection of its request for additional computing devices from the cloud computing service when no device at least meets the required specifications, and MCO service 122 submits a second request for multiple devices with collective capacity to meet or exceed the requested specifications.

According to an embodiment, MCO service 122 automatically identifies device specifications that are sufficient to run the number of additional pollers needed to achieve the target pull rate for message consumer client 114 based, at least in part, on historical information for the messaging system of network arrangement 100, as recorded by MCO service 122 (e.g., at database 130). For example, MCO service 122 records, in database 130, historical information that includes how many pollers a device successfully runs and how much RAM and CPU the device had available for pollers at the time. From such information, MCO service 122 calculates the average amount of RAM and CPU that is required to run a particular number of pollers.

Figure 3:
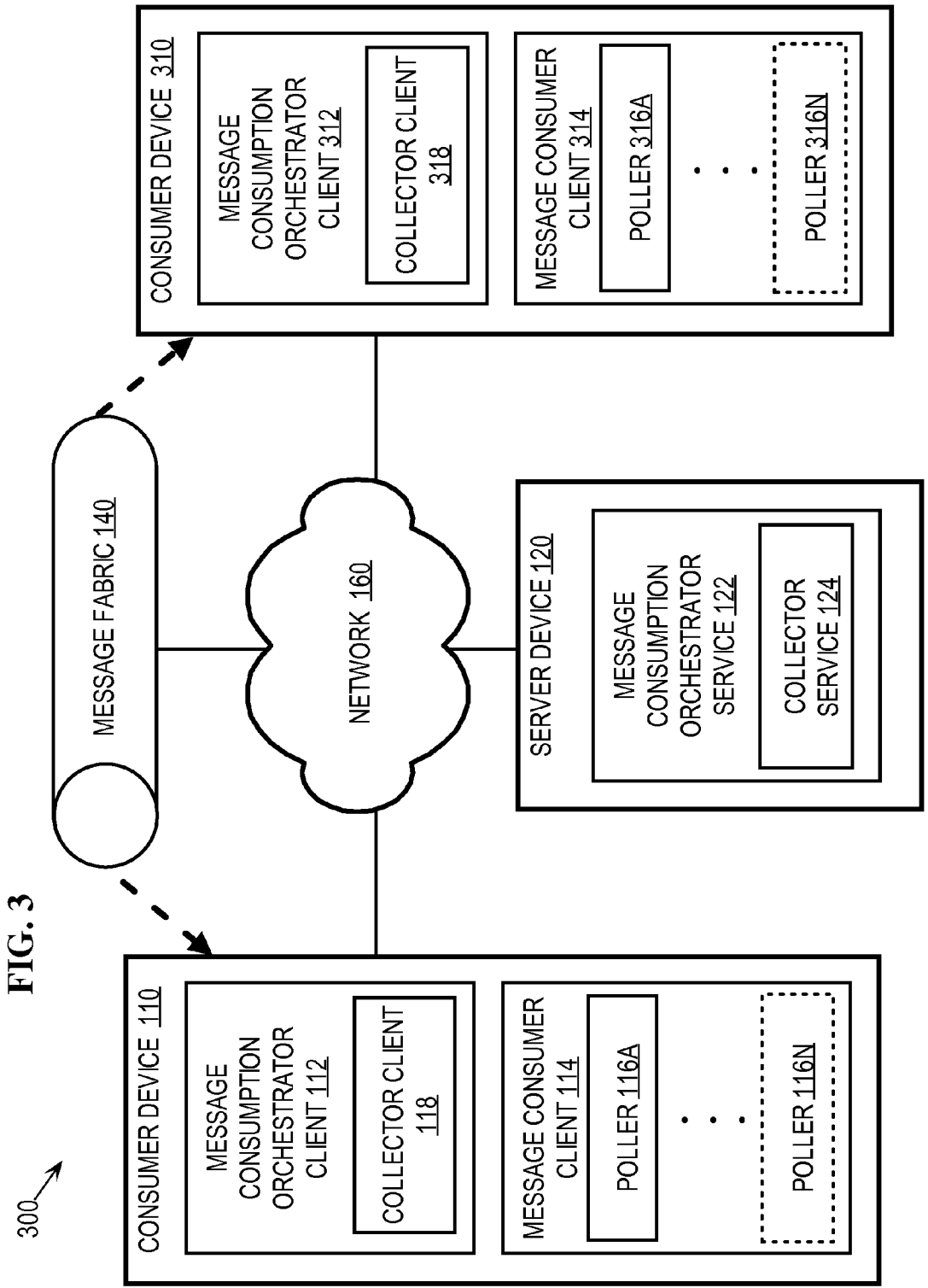
FIG. 3 depicts an example network arrangement with a message consumer client clone.

To illustrate the provisioning of additional resources, FIG. 3 depicts an example network arrangement 300 with (a) a message consumer client clone (i.e., message consumer client 314 on consumer device 310); and (b) a subset of the entities of network arrangement 100, for simplicity. The cloud computing service that manages consumer device 110 provisions consumer device 310 in response to the request for additional resources from MCO service 122. While network arrangement 300 illustrates two consumer devices 110 and 310, the cloud computing service that manages consumer device 110 may provision any number of devices to run clones of message consumer client 114.

MCO service 122 configures consumer device 310 to serve as a clone of message consumer client 114. According to an embodiment, MCO service 122 causes the appropriate clients to be installed on consumer device 310 (i.e., at least MCO client 312, collector client 318, message consumer client 314, and one or more pollers 316A-316N). According to another embodiment, the cloud computing service managing consumer device 310 causes the appropriate clients to be installed on consumer device 310.

Message consumer client 314 serves as a message consumer clone for message consumer client 114. Specifically, message consumer client 314 retrieves or receives messages from the same sources of messages within message fabric 140 as message consumer client 114, and also processes the messages in the same manner as message consumer client 114. As such, the addition of message consumer client 314 increases the throughput of messages for message consumer client 114.

MCO service 122 identifies a number of pollers to instantiate for the new message consumer clone in order to attain the target pull rate for the particular message queue for message consumer client 114. Specifically, MCO service 122 collects capabilities information for consumer device 310 and/or message consumer client 314 via collector client 318 in a manner similar to collection of capabilities information described in connection with collector client 118 above.

Based, at least in part on the capabilities information for the new consumer clone, MCO service 122 causes a number of pollers 316A-316N to be initiated for message consumer client 314 in a manner similar to identifying a number of pollers and initiating the pollers for message consumer client 114 described above. Furthermore, MCO client 312 may be configured with logic similar to the logic described for MCO client 112 above.

Scaling Down

Running resources, for a message consumer, which resources are not running at full capacity constitutes a waste of resources. Therefore, if MCO service 122 determines that the target pull rate for the particular queue in message fabric 140 is less than the rate at which message consumer client 114 is currently pulling messages from the particular queue, then MCO service 122 identifies needed adjustments to decrease the resources allocated for message consumer client 114.

For example, MCO service 122 determines that the target pull rate for pulling messages from the particular queue for message consumer client 114 is supportable by fewer resources than are currently allocated for message consumer client 114. Specifically, MCO service 122 identifies a number of pollers needed to achieve the target pull rate, and the maximum number of pollers that may be terminated leaving message consumer client 114 the capacity to pull messages from message fabric 140 at the target pull rate. If there is only one device pulling messages for message consumer client 114 (i.e., consumer device 110), then MCO service 122 causes termination of the excess number of pollers from pollers 116A-116N. Specifically, MCO service 122 instructs MCO client 112 to cause message consumer client 114 to terminate the excess number of pollers from pollers 116A-116N.

Figure 4:
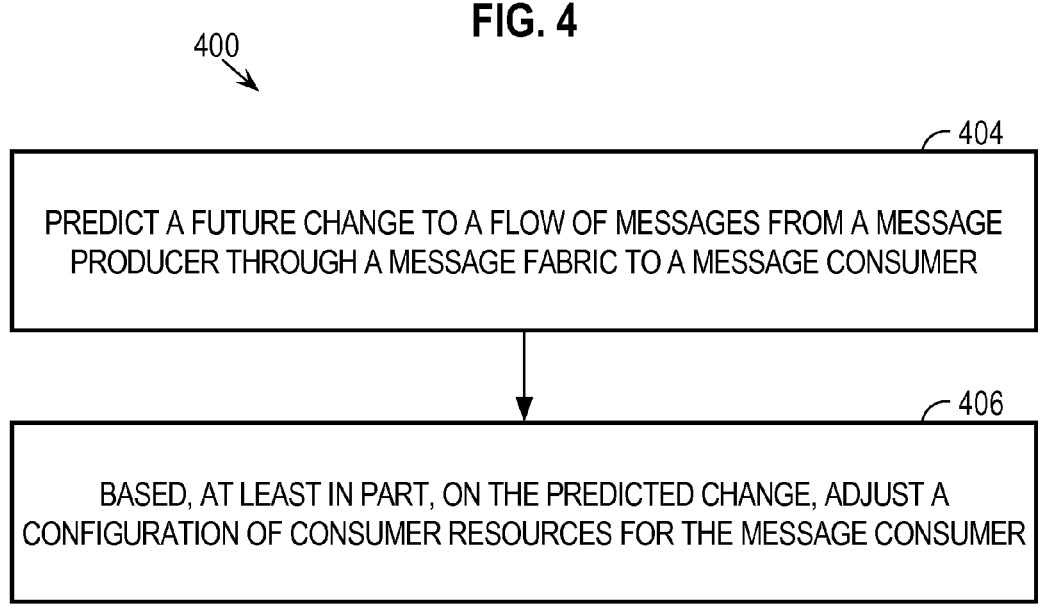
FIG. 4 illustrates a flowchart for predicting a future change to the flow of messages from a message producer and adjusting the configuration of consumer resources based, at least in part, on the predicted change.

However, if there are multiple devices pulling messages from message fabric 140 for message consumer client 114, then MCO service 122 identifies the optimum device, currently allocated for message consumer client 114, from which to remove pollers. For example, a particular device is running at most the number of pollers that should be terminated, and MCO service 122 selects the pollers from that particular device to be terminated since termination of those pollers would result in decommissioning an allocated device. Decommissioning an allocated device releases the resource to the cloud computing service that manages the device, freeing the device for other purposes. As a further example, if a particular device is designated as a valuable resource, e.g., by a cloud computing service that manages the device, then MCO service 122 selects pollers from that particular device to be terminated in order to free up capacity on the valuable resource Predicting Future Changes in Message Rates According to an embodiment, MCO service 122 predicts a message consumer's future need for resources based, at least in part, on historical information recorded by MCO service 122 and/or information from a third party information source. FIG. 4 illustrates a flowchart 400 for predicting a future change to the rate of a flow of messages from a message producer and adjusting the configuration of consumer resources based, at least in part, on the predicted future change.

At step 402, a future change to a flow of messages from a message producer through a message fabric to a message consumer is predicted. For example, MCO service 122 predicts a future change in the rate of messages that message producer service 152 sends to a particular queue in message fabric 140, for message consumer client 114, by identifying a pattern in changes of the rate of messages from message producer service 152 sent to the particular queue. MCO service 122 identifies patterns in changes of the rate of produced messages by analyzing historical information recorded by MCO service 122 and/or information from a third party information source. MCO service further analyzes the identified patterns to predict future changes in the rate of messages from message producer service 152 sent to the particular queue.

Predicting Change Based on Historical Information

According to an embodiment, MCO service 122 records collected capabilities information in database 130 as historical information. From such historical information, MCO service 122 identifies changes in the rate of messages sent to a particular message queue from message producer service 152. MCO service 122 stores the identified changes in the rate of messages as further historical information in database 130. In connection with the flow change information, MCO service 122 also records one or more of: a time of day, a day of the week, a time of year, a calendar date, etc.

MCO service 122 identifies patterns in changes in the rate of messages recorded in the historical information and stores the patterns in database 130. For example, MCO service 122 determines that the rate at which message producer service 152 sends messages to a particular queue in message fabric 140 surges between 9:00 AM and 12:00 PM on weekdays ("peak time"). In this example, the surge rate during this peak time is 65-75% of a particular baseline message rate, e.g., the highest recorded message production rate for message producer service 152. Herein, a percentage rate refers to a percentage of the baseline message rate. Based, at least in part, on this identified pattern of peak times, MCO service 122 predicts that the rate of messages from message producer service 152 to the particular queue will be at 65-75% between 9:00 AM and 12:00 PM on weekdays.

Returning to flowchart 400 of FIG. 4, at step 404, a configuration of consumer resources for the message consumer is adjusted based, at least in part, on the predicted change. For example, in response to predicting that the rate of messages from message producer service 152 to the particular queue will be at 65-75% between 9:00 AM and 12:00 PM on weekdays, MCO service 122 identifies a target pull rate for message consumer client 114 for the peak times, which is based, at least in part, on the predicted message production rate (i.e., 65-75%). MCO service 122 calculates a number of pollers needed to pull messages from the particular queue at the target pull rate (as described above).

MCO service 122 then determines whether to terminate pollers or to request additional resources for message consumer client 114 in order to achieve the target pull rate for the peak time. For example, MCO service 122 schedules, for a certain amount of time before the anticipated peak time (e.g., five minutes), an adjustment of resources for message consumer client 114 to account for the predicted surge rate (i.e., 65-75%). At the scheduled time, MCO service 122 determines that message consumer client 114 is running ten pollers on one or more consumer devices, and that, in order to pull resources at the target pull rate for the predicted peak time, message consumer client 114 requires 14 running pollers. Therefore, as described above, MCO service 122 causes message consumer client 114 to add four pollers, which may involve allocating additional resources, as needed, to run the needed 14 pollers. According to an embodiment, once the peak time is past, MCO service 122 decreases the number of pollers allocated for message consumer client 114.

As a further example, MCO service 122 identifies a pattern, from rate change data stored in historical information, indicating that message producer service 152 produces almost no messages (i.e., between 0%-5%) between 2:00 AM and 6:00 AM on weekdays ("dead time"). In response to identifying this pattern, MCO service 122 schedules a decrease of the resources allocated for message consumer client 114 to an amount that MCO service 122 calculates is sufficient to handle the dead time demand. The scheduled time may be at the predicted start of dead time, or a certain amount of time before or after the predicted start of dead time.

At the scheduled time, MCO service 122 reduces the number of pollers being used for message consumer client 114 and/or clones thereof, by releasing resources that are allocated for message consumer client 114, as described above. MCO service 122 may either decommission all resources allocated for message consumer client 114, or maintain one or more pollers retrieving any messages entering message fabric 140 for message consumer client 114 during the dead time. According to an embodiment, once the dead time is past, MCO service 122 increases the resources allocated for message consumer client 114.

According to an embodiment, MCO service 122 continually records identified patterns in database 130 and capabilities information and other information as historical information in database 130. MCO service 122 also updates stored patterns based, at least in part, on historical information that was recorded after the pattern was last updated. In response to updating the established pattern, MCO service 122 schedules adjustments to the resources for message consumer client 114 based, at least in part, on the updated pattern rather than based on the previous iteration of the pattern.

For example, after determining that 9:00 AM to 12:00 PM on weekdays is a peak time for the flow of messages from message producer service 152 for the particular queue, MCO service 122 records additional historical information. MCO service 122 analyzes at least the additional historical information and, based on the analysis, determines that the peak time for the flow of messages is now 9:45 AM to 12:00 PM on weekdays and 7:00 PM to 10:30 PM on Sunday through Thursday. MCO service 122 updates the peak time pattern in database 130 accordingly, and adjusts the schedule for handling the peak time.

Adjusting Resources for Predicted Message Broadcasts

According to an embodiment, MCO service 122 adjusts resources allocated to message consumer client 114 based on predicted message broadcasts to which message consumer client 114 subscribes, e.g., through message fabric 140. To illustrate, MCO service 122 collects capabilities information that indicates when message consumer client 114 receives broadcast messages and records such as historical information in database 130. MCO service 122 analyzes the historical information to identify a pattern in the receipt of broadcast messages. For example, MCO service 122 determines a pattern that message consumer client 114 generally receives the equivalent of a 10% rate of broadcast messages on the last day of a school's semester, information about which MCO service 122 receives from a third party information source, as described in further detail below. Based on the identified pattern, MCO service 122 schedules an increase of the resources allocated for message consumer client 114 to accommodate 10% more messages on the last day of the school's semesters, as described above.

Predicting Change Based on Third Party Information Sources

According to an embodiment, MCO service 122 receives information from a third party information source ("information source"), which is not depicted in FIG. 1 or 3. A third party information source is none of the message producer, message fabric, or message consumer. An information source provides MCO service 122 with information that MCO service 122 analyzes to identify patterns of changes in the rate of messages from message producer service 152, and to anticipate resource needs based, at least in part, on the patterns.

An information source may send, to MCO service 122, any kind or format of data, e.g., documents, pdfs, tables, XML, HTML, SOAP messages, etc. For example, an information source sends, to MCO service 122, one or more of: summaries of information, such as critical dates; a projected rate of messages; potential indicators of message rate; etc. As another example, an information source sends unprocessed data for MCO service 122 to process, such as syllabuses for a school's educational courses.

In order for MCO service 122 to recognize a third party information source as a valid source of information, the source may register with MCO service 122 (with or without authenticating information) as having information relevant to message producer service 152 and/or message consumer client 114. Further, one or more of the following may register an information source with MCO service 122: MCO client 112, message consumer client 114, a cloud computing service that manages consumer device 110, etc.

An information source may communicate information with MCO service 122 via broadcast, such that MCO service 122 subscribes to a broadcast from the information source. Furthermore, an information source may implement a collector client, such as collector client 118, which is configured to communicate, to MCO service 122, information from a database associated with the information source, from a broadcast to which the information source subscribes, or from other auxiliary sources of information.

An information source may indicate an explicit association between particular communicated information and one or more queues or broadcasts within message fabric 140. Thus, MCO service 122 may use the communicated information to identify patterns for those consumers that subscribe to the one or more queues or broadcasts that the information source associated with the communicated information.

The following example illustrates MCO service 122 receiving and analyzing information from a third party information source. In this example, message consumer client 114 receives and processes messages that represent submissions of homework assignments and completed examinations for a particular school. Administrators for the school set up an information source, such as a server computing device communicatively coupled to network 160, that is registered with MCO service 122 as supplying information pertinent to the flow of messages from message producer service 152.

After it is registered with MCO service 122, the information source sends, to MCO service 122, syllabus data for one or more courses that use message producer service 152 to facilitate processing the submission of homework assignments and exams. For example, the syllabus data includes information about: the start date of courses; the duration of courses; the frequency and timing of examinations and homework assignments for the courses; due dates; vacations; the date of a final exam or project; etc.

MCO service 122 is configured to parse the syllabus data and extract data therefrom that is pertinent to identifying patterns in changes of the rate of messages from message producer service 152. To illustrate, the third party information source informs MCO service 122 that 200 of 1500 available courses have a final exam or project due on the same particular day. MCO service 122 determines, from historical data, that there is a 10-12% rise in the rate of messages produced by message producer service 152 on days where 200-225 courses have an exam or project due on the same day. From this identified pattern, MCO service 122 predicts that message producer service 152 will produce 10-12% additional messages on the particular day, and MCO service 122 schedules an increase of allocated resources for message consumer client 114 a certain amount of time before the predicted start of the predicted rise in rate. MCO service 122 adjusts the allocated resources based on the schedule, as described above.

Predicting Change Based on Both Historical Data and Third Party Information Sources MCO service 122 may also use historical information that MCO service 122 stored at database 130 in conjunction with data received from an information source to identify patterns in the message flow. For example, based on historical data, MCO service 122 determines that, historically, the third week of a six-week course generally coincides with an uptick in messages from message producer service 152 resulting from homework submissions or exams taken, e.g., by 25% if 500-600 six week courses start at the same time. From the registered information source, MCO service knows that 556 six-week courses recently started on the same day. Therefore, MCO service 122 schedules an increase of the resources for message consumer client 114 to handle 25% more messages from message producer service 152 to anticipate the period of predicted increased activity, as described above.

As a further example, the information source identifies a particular week as a school-wide vacation week. From historical data, MCO service 122 determines that message producer service 152 generates a message output level of 5% during the first three days of a school-wide vacation week. As such, MCO service 122 predicts dead time for the first three days of the school wide vacation week and schedules a reduction of resources for message consumer client 114 in anticipation of the dead time, as described above.

As yet a further example, message consumer client 114 receives and processes messages that represent credit card transactions from message producer service 152. An information source that supplies information pertinent to the flow of messages from message producer service 152 sends, to MCO service 122, holiday shopping season dates. According to one embodiment, the data from the information source indicates that a higher-than-average amount of transactions are expected during the holiday shopping season dates. According to another embodiment, MCO service 122 determines, based on historical data, that the rate of messages during holiday shopping seasons is usually 75%-95%. Based, at least in part, on the historical data, MCO service 122 predicts a 75%-95% message flow rate during the holiday shopping season indicated in the information from the information source. Accordingly, MCO service 122 schedules resources for message consumer client 114 to handle the predicted message flow rate for the predicted dates.

Automatic Correlation of Third Party Information to Message Flow Patterns

According to an embodiment, MCO service 122 automatically determines that information received from a particular information source informs identification of patterns in changes of the rate of the flow of messages from message producer service 152 through message fabric 140 to message consumer client 114.

To illustrate, MCO service 122 receives first information from a third party information source. For example, MCO service 122 receives calendar information, indicating the dates of government holidays for the current year, from a third party information source. The third party information source is not registered with MCO service 122 as producing information relevant to a flow of messages from message producer service 152, nor does MCO service 122 have access to any other information that indicates an explicit connection between the information source and message producer service 152.

MCO service 122 detects an actual change in the rate of messages from message producer service 152 through message fabric 140 to message consumer client 114. For example, MCO service detects that message production from message producer service 152 drops by 25% on certain days, which drop is currently unexplained by analysis of information that MCO service 122 has for message producer service 152 (e.g., from information sources that are explicitly connected to message producer service 152 within database 130, in historical information for message producer service 152, etc.).

Based, at least in part, on detecting the actual change in the rate of messages from message producer service 152, MCO service 122 identifies a correlation between the first information and the actual change in the rate of messages. For example, MCO service 122 analyzes information in database 130, from information sources that are not explicitly connected to message producer service 152, to identify patterns that predict the detected actual change in the flow of messages, at least in part. According to an embodiment, MCO service 122 initiates such analysis when a threshold amount of change in the rate of message flow is detected and unexplained. The threshold for the amount of change is, according to embodiments, learned by MCO service 122 based, at least in part, on historical data; or is configured by an administrator; etc.

As a result of analyzing information in database 130 from information sources that are not explicitly connected to message producer service 152 within database 130, MCO service 122 determines that the 25% drop in message flow from message producer service 152 correlates with days during a government holiday that are not the last day of the government holiday (as indicated by the first information), and records this pattern in database 130.

MCO service 122 uses the pattern to predict a future change to the rate of the flow of information from message producer service 152. For example, MCO service 122 predicts a 25% drop in the rate of messages from message producer service 152 on the next day that is a government holiday, which is not the last day of the holiday ("the predicted rate drop day"). MCO service schedules a reduction of resources to account for the predicted 25% drop in message flow for message consumer client 114 in anticipation of the predicted rate drop day, such that the reduction of resources is implemented for when the drop in message rate is predicted to occur, as described above.

Managing Multiple Message Consumers

According to an embodiment, MCO service 122 manages the configuration of multiple message consumers, including message consumer client 114. A message consumer may register with MCO service 122 to allow MCO service 122 to optimize the throughput of messages for the associated messaging system. According to an embodiment, an MCO client, such as MCO client 112, automatically registers the associated message consumer with MCO service 122 when MCO client 112 is communicatively connected to MCO service 122 (i.e., via network 160) for the first time.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
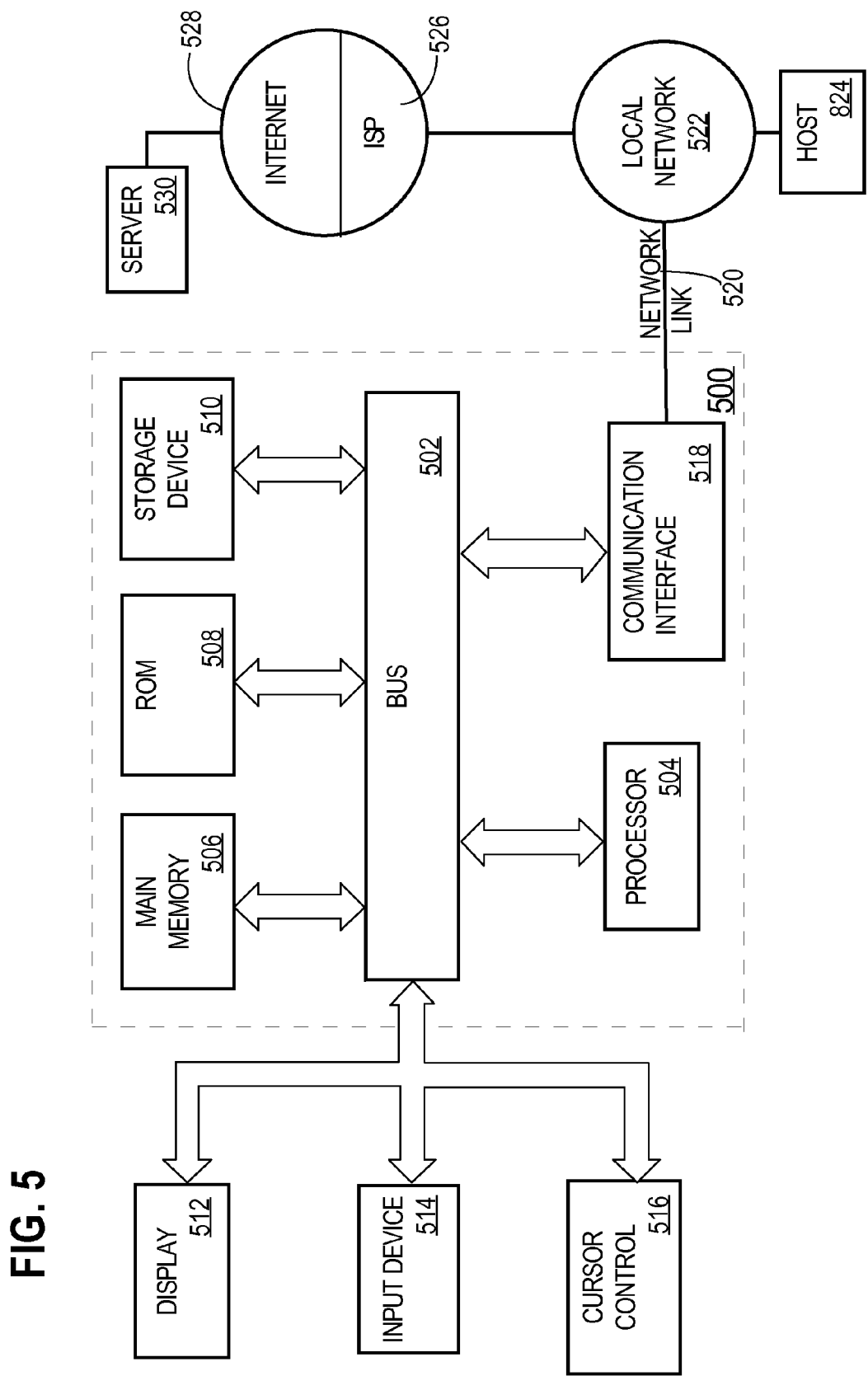
FIG. 5 is a block diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    using a message consumer executing on a particular device to pull, from a message fabric, messages that were produced by a message producer;
    gathering capabilities information for at least one of:
        the message producer,
        the message fabric, or
        the message consumer;
    based, at least in part, on the capabilities information, automatically executing at least one consumer clone, of the message consumer, on one or more devices, other than the particular device;
    wherein, prior to executing the at least one consumer clone, the one or more devices are not being used to pull messages from the message fabric for the message consumer;
    wherein automatically executing the at least one consumer clone, of the message consumer, on one or more devices, other than the particular device is further based, at least in part, on a target pull rate for the message consumer pulling messages from the message fabric;
    wherein the method is performed by one or more computing devices.

2. The method of claim 1, further comprising setting the target pull rate by:
    determining whether a particular queue within the message fabric has more than a threshold number of messages stored therein;
    in response to determining that the particular queue within the message fabric has more than the threshold number of messages stored therein, setting the target pull rate to be faster than a rate that the message producer is currently sending messages to the particular queue.

3. A method comprising:
    based on historical information, identifying a pattern in timing of changes in a rate of message flow between a message producer and a message fabric;
    based, at least in part, on the pattern, predicting a future change to a flow of messages from the message producer through the message fabric to a message consumer;
    in response to predicting the future change to the flow of messages, automatically scheduling a future adjustment of consumer resources allocated to the message consumer;
    wherein the future adjustment is scheduled to occur at a scheduled adjustment time;
    in response to reaching the scheduled adjustment time, and based, at least in part, on the predicted change, automatically adjusting consumer resources allocated to the message consumer;
    receiving at least a portion of the historical information from a third party information source;
    wherein the historical information comprises information identifying two or more critical dates of a certain type;
    wherein a first critical date of the two or more critical dates occurred in the past;
    wherein predicting the future change to the flow of messages from the message producer through the message fabric to the message consumer comprises:
    determining that, on the first critical date, the flow of messages had a particular peak rate, and based, at least in part, on the type of the first critical date being the same as the type of a second critical date, of the two or more critical dates, predicting that the second critical date of the two or more critical dates is the date of the future change to the flow of messages;
    wherein the method is performed by one or more computing devices.

4. The method of claim 3, further comprising gathering at least a portion of the historical information from one or more of the message producer, the message fabric, or the message consumer.

5. One or more non-transitory computer readable media storing one or more sequences of instructions which, when executed by one or more processors, cause:
    using a message consumer executing on a particular device to pull, from a message fabric, messages that were produced by a message producer;
    gathering capabilities information for at least one of:
        the message producer,
        the message fabric, or
        the message consumer;
    based, at least in part, on the capabilities information, automatically executing at least one consumer clone, of the message consumer, on one or more devices, other than the particular device;

wherein, prior to executing the at least one consumer clone, the one or more devices are not being used to pull messages from the message fabric for the message consumer;

wherein automatically executing the at least one consumer clone, of the message consumer, on one or more devices, other than the particular device is further based, at least in part, on a target pull rate for the message consumer pulling messages from the message fabric.

6. The one or more non-transitory computer readable media of claim 5, wherein the one or more sequences of instructions further comprise instructions which, when executed by one or more processors, cause setting the target pull rate by:

determining whether a particular queue within the message fabric has more than a threshold number of messages stored therein;

in response to determining that the particular queue within the message fabric has more than the threshold number of messages stored therein, setting the target pull rate to be faster than a rate that the message producer is currently sending messages to the particular queue.

7. One or more non-transitory computer readable media storing one or more sequences of instructions which, when executed by one or more processors, cause:

based on historical information, identifying a pattern in timing of changes in a rate of message flow between a message producer and a message fabric;

based, at least in part, on the pattern, predicting a future change to a flow of messages from the message producer through the message fabric to a message consumer;

in response to predicting the future change to the flow of messages, automatically scheduling a future adjustment of consumer resources allocated to the message consumer;

wherein the future adjustment is scheduled to occur at a scheduled adjustment time;

in response to reaching the scheduled adjustment time, and based, at least in part, on the predicted change, automatically adjusting consumer resources allocated to the message consumer;

receiving at least a portion of the historical information from a third party information source;

wherein the historical information comprises information identifying two or more critical dates of a certain type;

wherein a first critical date of the two or more critical dates occurred in the past;

wherein predicting the future change to the flow of messages from the message producer through the message fabric to the message consumer comprises:

determining that, on the first critical date, the flow of messages had a particular peak rate, and based, at least in part, on the type of the first critical date being the same as the type of a second critical date, of the two or more critical dates, predicting that the second critical date of the two or more critical dates is the date of the future change to the flow of messages.

8. The one or more non-transitory computer readable media of claim 7, wherein the one or more sequences of instructions further comprise instructions which, when executed by one or more processors, cause gathering at least a portion of the historical information from one or more of the message producer, the message fabric, or the message consumer.

* * * * *